United States Patent Office 3,662,016
Patented May 9, 1972

3,662,016
METHOD FOR THE PRODUCTION OF ISOPRENE
Itsuo Furuoya, Amagasaki, Katsuhiko Ogino, Toyonaka, Yoshio Kamatani, Osaka, and Kenji Naito, Toyonaka, Japan, assignors to Takeda Chemical Industries, Ltd., Osaka, Japan
No Drawing. Filed Aug. 3, 1970, Ser. No. 60,766
Claims priority, application Japan, Aug. 2, 1969, 44/61,330
Int. Cl. C07c 1/00, 1/20; B01j 11/06
U.S. Cl. 260—681                5 Claims

ABSTRACT OF THE DISCLOSURE

Isoprene is produced in high yield by the condensation reaction between isobutylene and formaldehyde in the presence of a solid acid catalyst comprising silicon oxide and antimony oxide.

---

The present invention relates to a method for the production of isoprene. More specifically, the invention relates to a method for the production of isoprene, which is characterized by reacting isobutylene with formaldehyde in the vapor phase in the presence of a solid acid catalyst comprising silicon oxide and antimony oxide.

To meet the increasing demand for isoprene as a starting material for the production of synthetic rubbers and the like, it is desired to manufacture easily isoprene in high purity as well as in good yield. For this purpose, the direct production (one stage process) through the condensation between isobutylene and formaldehyde was recommended on account of its simplified procedures, and there have been reported several catalysts including alumina, silica-alumina, cadmium phosphate, phosphoric acid-chromium oxides (or hydroxides), phosphoric acid-manganese oxides (or hydroxides) or the like as the catalysts for the one stage process.

However these hitherto known catalysts have the following serious drawbacks;

(1) poor in the conversion ratio of formaldehyde (i.e. the ratio of the amount of reacted formaldehyde relative to that of the supplied formaldehyde), and
(2) poor in selectivity of reacted formaldehyde to isoprene.

None has been entirely successful in solving these problems as far as the present inventors are aware.

Now the present inventors have found unexpectedly that the solid acid catalyst comprising silicon oxide and antimony oxide completely solves both of said disadvantages, and at the same time that the solid acid catalyst further comprising as a minor ingredient, at least a member selected from the group consisting of Ti, Zr, V, Cr, Mo, W, Mn, Fe, Co, Ni, Cu, Zn, Ag, Cd, Ca, Mg, B, Al, Tl, Sn, Pb, P and Bi can furthermore enhance the conversion ratio of formaldehyde and/or the selectivity of the reacted formaldehyde to isoprene. Further, the life time of the solid acid catalyst is prolonged by the addition of the Al ingredient as the minor ingredient to the catalyst comprising silicon oxide and antimony oxide. The present invention is based on these new findings.

Therefore, the main object of the present invention is to provide an industrially feasible method for the production of isoprene in high purity as well as in high yield with low production cost.

Said object is realized by reacting isobutylene with formaldehyde in vapor phase in the presence of a solid acid catalyst comprising silicon oxide and antimony oxide.

The solid acid catalyst is prepared by suitable process, for example, by combining a silicon component with the antimony component and heating the mixture.

The silicon component is exemplified by silicon oxide (e.g., silica xerogel, silica hydrogel, silica sol, crystalline silica or the like), silicic acid salt (e.g. potassium silicate, sodium silicate or the like), silicon halide (e.g. silicon tetrachloride, silicon tetrafluoride or the like), silicic acid ester (e.g. tetraethyl ortho-silicate or the like), other compounds which are easily convertible to silicon component and clay minerals containing such compounds.

The antimony component is exemplified by antimony oxide (e.g., diantimony trioxide, diantimony tetroxide, diantimony pentoxide or the like), antimonic acid (e.g. ortho-antimonic acid, metha-antimonic acid or the like), antimony halide or its partial hydrolyzate (e.g. antimony tetrachloride, antimony pentafluoride, antimony trichloride, antimony tribromide, antimony oxychloride or the like), an organic antimony compound (e.g. antimony triisopropoxide or the like), antimony salt (e.g. antimony sulfide, antimony sulfate, tartar emetic or the like), antimonic acid salt (e.g., potassium antimonate or the like).

Those two components are combined by admixing or reacting with each other according to the per-se known means, for example, (1) admixing an aqueous solution of the silicon component with an aqueous solution of antimony component, which leads to the gelation of both components, (2) impregnating one component with an aqueous solution of the other component, (3) ion exchange means or (4) physical means by the use of ball mill, kneader and the like. When a component other than silicon oxide is employed as a silicon component or alternatively when a component other than antimony oxide is used as an antimony component, it is recommended that the combined materials of the two components are followed by hydrolysis with an aqueous solution of mineral acid (e.g., hydrochloric acid, sulfuric acid or the like) and/or by heating in the presence of oxygen so as to obtain a solid acid catalyst mainly composed of silicon oxide and antimony oxide.

The amount of antimony oxide relative to the amount of silicon oxide in a solid acid catalyst is variable over wide range, however, it is usually about 1/500 to 50, preferably about 1/50 to 30, most desirably about 1/20 to 10 in terms of the weight ratio of antimony to silicon.

The solid acid catalyst may further comprise at least the minor ingredient, at least a member selected from the group consisting of Ti, Zr, V, Cr, Mo, W, Mn, Fe, Co, Ni, Cu, Zn, Ag, Cd, Mg, Ca, B, Al, Tl, Sn, Pb, P, Bi in order to improve the conversion ratio of formaldehyde and/or the selectivity of reacted formaldehyde to isoprene.

The addition of the Al ingredient as the minor ingredient is also recommended so as to prolong the active life of the solid acid catalyst.

The addition of the minor ingredient or ingredients may be effected whether prior to the combination of the two components or after the combination of the two components.

Those minor ingredients may be added to the catalyst in the form of the corresponding nitrates, halides, sulfates, organic acid (e.g. acetic acid or the like) salts, ammonium salts or other conventional salts.

The amount of said minor ingredient or ingredients relative to silicon oxide is usually about 1/10,000 to about 1/1, preferably about 1/1000 to about 1/1, most preferably 1/1000 to about 1/3 in terms of weight ratio of the corresponding element or elements to silicon involved.

Through heating procedure or the reaction process between isobutylene and formaldehyde, those minor ingredients may be converted into the corresponding ions, elements themselves, hydroxyl compounds, oxides, transitional intermediates thereto or chemically combined compounds with silicon oxide or antimony oxide.

The mixture is preferably heated at a temperature ranging from about 100° C. to about 1200° C., more preferably from about 300° C. to about 800° C. The heating procedure is usually carried out in the presence of air, inert gases (e.g. nitrogen, carbon dioxide, etc.), oxygen or steam.

The condensation reaction between isobutylene and formaldehyde is usually carried out at a temperature more than 180° C., and therefore it is not essential to effect the heating procedure prior to its use in the reaction.

The method of the present invention is effected by the condensation reaction between isobutylene and formaldehyde in vapor phase in the presence of the above mentioned catalyst.

The molar ratio of isobutylene to formaldehyde may be varied according to the reaction conditions, but an excess of isobutylene, i.e. more than 3 mols of isobutylene per a mol of formaldehyde is preferred.

These two raw materials are reacted with each other in vapor phase usually at a temperature more than 180° C., preferably from about 250° C. to about 300° C.

The residence time of reactants including isobutylene and formaldehyde on the acidic catalyst may also be variable in accordance with other reaction conditions, but it is preferred to be in the range from about 1 to about 100 g. hour per mol of reactants. The reaction pressure may be an atmospheric pressure, a reduced pressure or an elevated pressure, but a slightly elevated pressure is effectively adopted for the purpose of high production of isoprene.

In effecting the method of the present invention, some materials which do not disturb the reaction may be added to the reaction system as the diluent of the raw materials. The inert gaseous materials are exemplified by steam, methanol, nitrogen gas, air, carbon dioxide, a paraffin hydrocarbon (e.g. methane, ethane, propane or the like). Particularly, the presence of steam is desired to prevent the catalyst from an abrupt degradation of activities, and to increase the selectivity of the reacted formaldehyde to isoprene.

When the activities of the solid acid catalyst has dropped in a long lapse of the reaction time in view of the conversion and selectivity, the catalyst is regenerated by heating the catalyst in the presence of air, oxygen or steam, and is applicable again to the condensation reaction.

The catalyst may take the form of a fixed bed, a fluidized bed, a moving bed or the like, however, the fixed bed in the swing system is most desirable.

The reaction product is either condensed or absorbed in a suitable solvent, and is recovered by per se known fractional distillation or other conventional procedures. Unreacted isobutylene and formaldehyde can be separated and recycled to the condensation reaction as the starting materials.

Thus isoprene is produced in high conversion ratio as well as in high selectivity, and the obtained isoprene has the supreme purity of more than 99%.

The following examples will serve to further illustrate the method of the present invention with no intention of limiting the scope of the present invention thereto.

In these examples, the conversion ratio as well as the selectivity to isoprene are shown in terms of mean value within the definite reaction time effected. Gram(s), kilogram(s), liter(s) and milliliter(s) are simply abbreviated as g., kg., l. and ml. respectively.

EXAMPLE 1

1 kg. of sodium silicate (Japanese Industrial Standard Grade No. 3) is dissolved into 6 litres of water, followed by the gradual addition, with stirring, of a solution of 53 g. of antimony trichloride in 480 ml. of 6 N HCl so as to make a sol. The sol is adjusted to pH 2 to 3 and, heated for 3 hours at 100° C. to obtain the clear hydrogel in the jelly form. The hydrogel is cut with knife into cubes of about 8 cm.$^3$ and washed with a distilled water until sodium ion is not detected. The hydrogel is dried at 100° C. for 4 hours, thus obtained xerogel being crushed and sieved to obtain a solid acid catalyst of 5 to 20 Tyler mesh size. 15 parts by weight of thus obtained catalyst is packed into a tube reactor.

Isobutylene (50.49 parts by weight/hour) and a 40 weight percent aqueous formaldehyde solution (9.65 parts by weight/hour) are fed into the reactor at 300° C., and the reaction is continued for 4 hours at atmospheric pressure. The desired isoprene is cooled and trapped in the liquid form, while unreacted formaldehyde and steam are separated by absorption in water. The purified isoprene is obtained by the fractional distillation of said trapped product.

Conversion of formaldehyde: 72%
Selectivity to isoprene: 77%
Purity of isoprene: more than 99%

EXAMPLE 2

Sodium silicate (Japanese Industrial Standard Grade No. 3) is neutralized with an aqueous sulfuric acid to make a silica xerogel. The silica xerogel is crushed and sieved to 5 to 20 Tyler mesh size. A 500 g. portion of the xerogel is immersed into 1.2 litres of 3 N HCl containing 46 g. of antimony trichloride. The mixture is allowed to stand at a room temperature with occasional stirring for a day, and place dinto an evaporating dish. Water and hydrogen chloride are evaporated off on a boiling water bath. The residue is heated in a current of air and steam at 400° C. for 2 hours to obtain a solid catalyst. The same condensation reaction is effected by the use of thus prepared catalyst in the same manner as in Example 1, and the following data are obtained.

Conversion of formaldehyde: 86%
Selectivity of isoprene: 74%
Purity of isoprene: more than 99%

EXAMPLE 3

57.6 g. of antimony pentachloride is gradually added to 1.8 litres of water to obtain the colloidal $Sb(OH)_5$ as fine precipitates. The precipitates are well admixed with 1250 g. of silica hydrogel containing 200 g. of silica, and the mixture is kneaded with a kneader for 12 hours, followed by the washing with water. The resultant is dried, crushed and sieved to obtain a catalyst of 5 to 20 Tyler mesh size. The catalyst is heated at 300° C. for 3 hours. The condensation reaction is carried out in the same manner as in Example 1 by the use of the above prepared catalyst, and the following data are obtained.

Conversion of formaldehyde: 92%
Selectivity to isoprene: 71%
Purity of isoprene produced: more than 99%

EXAMPLE 4

200 g. of the solid acid catalyst prepared in Example 2 is impregnated with 620 ml. of an aqueous ammonia containing 2.8 g. of silver orthphosphate. Then the mixture is heated at 400° C. for 2 hours, and thus prepared catalyst is subjected to the condensation reaction in the same manner as in Example 1. The results are shown below:

Conversion of formaldehyde: 91%
Selectivity of isoprene: 71%
Purity of isoprene obtained: more than 99%

EXAMPLE 5

10 g. of aluminum orthoantimonate in the form of fine powder is dissolved into 90 ml. of N HCl, and 625 g. of silica hydrogel containing 100 g. of silica is impregnated with the resulting solution. The mixture is dried at 100° C. for 30 minutes and placed into an extruder to prepare granules of 5 mm. in diameter and 6 mm. in length. The granules are dried in the air and heated at 600° C. for 4 hours to make a final solid catalyst. The condensation reaction between isobutylene and formaldehyde is carried out in the same manner as in Example 1 by the use of the above prepared catalyst. The results are shown as follows.

Conversion of formaldehyde: 72%
Selectivity to isoprene: 74%
Purity of isoprene: more than 99%

EXAMPLE 6

A 15 g. portion of the solid acid catalyst prepared in Example 2 is impregnated with each of the following solution for 24 hours. The mixtures are concentrated to dryness on a boiling water bath for 3 hours. The residue is heated in the atmosphere of steam and air at 400° C. for 2 hours to make solid catalysts.

Sort of the solutions:

(1) 0.241 g. of titanium tetrachloride in 50 ml. of 3 N HCl
(2) 0.200 g. of zirconyl nitrate in 100 ml. of water
(3) 0.808 g. of ferric nitrate in 100 ml. of water
(4) 1.45 g. of bismuth nitrate in 100 ml. of N $HNO_3$
(5) 0.123 g. of anhydrous calcium nitrate in 100 ml. of water
(6) 0.562 g. of tungstic acid in 100 ml. of N aqueous $NH_3$ solution Each of the 6 solid acid catalysts is employed in the same condensation reaction as in Example 1, and the results are tabled below for each solid catalyst.

| Sort of the solution | Percent | | |
|---|---|---|---|
| | Conversion of formaldehyde | Selectivity to isoprene | Purity of isoprene |
| (1) | 83 | 78 | More than 99. |
| (2) | 89 | 72 | Do. |
| (3) | 86 | 75 | Do. |
| (4) | 87 | 77 | Do. |
| (5) | 84 | 76 | Do. |
| (6) | 88 | 74 | Do. |

EXAMPLE 7

15 g. of aluminum nitrate, 9.15 g. of antimony trichloride and 2.30 g. of 85% (on weight basis) orthophosphoric acid are added to 500 g. of silica hydrosol containing 20% (on weight basis) of $SiO_2$. To the mixture is dropwise added 100 ml. of 3.3 N aqueous $NH_3$ solution until the gelatin is completed. The gel is dried at 100° C. for 4 hours to make a xerogel. The xerogel is crushed and classified into about 7 to 20 Tyler mesh size, and then calcined in the presence of steam and air at 400° C. for 2 hours. The condensation reaction by the use of thus prepared catalyst is effected according to the same reaction conditions as in Example 1, and the following results are obtained.

Conversion of formaldehyde: 89%
Selectivity to isoprene: 71%
Purity of isoprene: more than 99%

A similar catalyst is prepared from 100 g. of aluminum nitrate, 18.3 g. of antimony trichloride, 18.4 g. of 85% (on weight basis) orthophosphoric acid and 500 g. of silica hydrosol containing 20% (on weight basis) of $SiO_2$ according to the above mentioned procedures. The employment of this catalyst gives the following results.

Conversion of formaldehyde: 98%
Selectivity to isoprene: 63%
Purity of isoprene: more than 99%

What is claimed is:

1. A method for producing isoprene, which is characterized by reacting isobutylene with formaldehyde in vapor phase in the presence of a solid acid catalyst comprising silicon oxide and antimony oxide.

2. A method as claimed in claim 1, wherein the amount of antimony oxide relative to the amount of silicon oxide in the solid acid catalyst is about 1/50 to 30 in terms of the weight ratio of antimony to silicon.

3. A method as claimed in claim 1, wherein the amount of antimony oxide relative to the silicon oxide in the solid acid catalyst is about 1/20 to 10 in terms of the weight ratio of antimony to silicon.

4. A method as claimed in claim 1, wherein the solid acid catalyst further comprises, as a minor ingredient, at least a member selected from the group consisting of Ti, Zr, W, Fe, Ag, Ca, Al, P and Bi, the amount of said minor ingredient or ingredients relative to silicon oxide being about 1/1000 to about 1/1 in terms of weight ratio of the corresponding element or elements to silicon.

5. A method as claimed in claim 1, wherein the solid acid catalyst further comprises as a minor ingredient, at least a member selected from the group consisting of Ti, Zr, V, Cr, Mo, W, Mn, Fe, Co, Ni, Cu, Zn, Ag, Cd, Mg, Ca, B, Al, Tl, Sn, Pb, P and Bi, the amount of said minor ingredient or ingredients relative to silicon oxide being about 1/1000 to about 1/1 in terms of weight ratio of the corresponding element or elements to silicon.

References Cited

UNITED STATES PATENTS 3,146,278  8/1964  Habeshaw et al. _____ 260—681
3,056,845  10/1962  Bennett et al. _____ 260—681

DELBERT E. GANTZ, Primary Examiner

G. E. SCHMITKONS, Assistant Examiner

U.S. Cl. X.R.

252—456